United States Patent [19]

Donahue et al.

[11] Patent Number: 5,048,033
[45] Date of Patent: Sep. 10, 1991

[54] METHOD AND APPARATUS FOR CONTROLLING THE POWER SUPPLY OF A LASER OPERATING IN A PULSE MODE

[75] Inventors: Joel A. Donahue, Brookfield, Mass.; Alan M. Neech, Yorkshire, England

[73] Assignee: Coherent, Inc., Palo Alto, Calif.

[21] Appl. No.: 577,875

[22] Filed: Sep. 4, 1990

[51] Int. Cl.⁵ .............................................. H01S 3/00
[52] U.S. Cl. ....................................... 372/38; 372/69; 372/33; 372/32; 328/267; 315/291; 315/307
[58] Field of Search .......................... 372/38, 69, 33; 328/258, 267, 67; 315/84.51, 291, 302, 307-311

[56] References Cited

U.S. PATENT DOCUMENTS

| | | | |
|---|---|---|---|
| 3,749,976 | 7/1973 | Colyn | 372/38 |
| 3,928,819 | 12/1975 | Bernstein | 372/38 |
| 4,745,614 | 5/1988 | Egawa et al. | 372/38 |

Primary Examiner—Leon Scott, Jr.
Attorney, Agent, or Firm—Limbach, Limbach & Sutton

[57] ABSTRACT

An electronics controller for controlling the power supply of a laser operating in a pulse mode is disclosed. The power supply is of the type having a resonant DC converter, charging a capacitive storage means with an inverter stage driving the laser discharge tube. The current supplied to the laser discharge tube is monitored. In addition, the voltage of the capacitive storage means is also measured. Set points for the current, the voltage, and on/off are provided to the electronics controller as the comparison points for the controller. Based upon the voltage and current detected, and the set points provided, the controller controls the on/off of the converter and its frequency, and the on/off of the inverter.

18 Claims, 15 Drawing Sheets

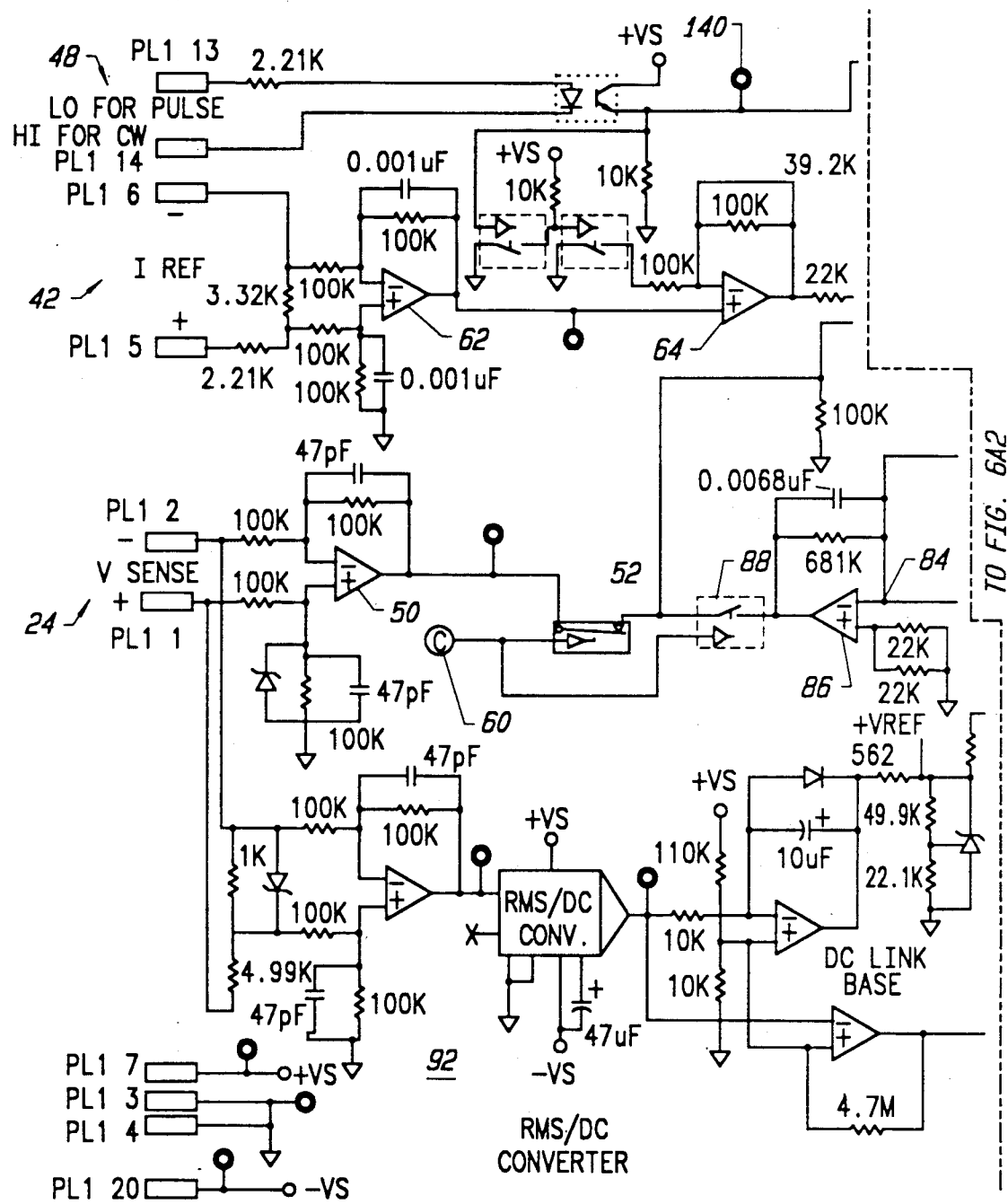
FIG. 6A1

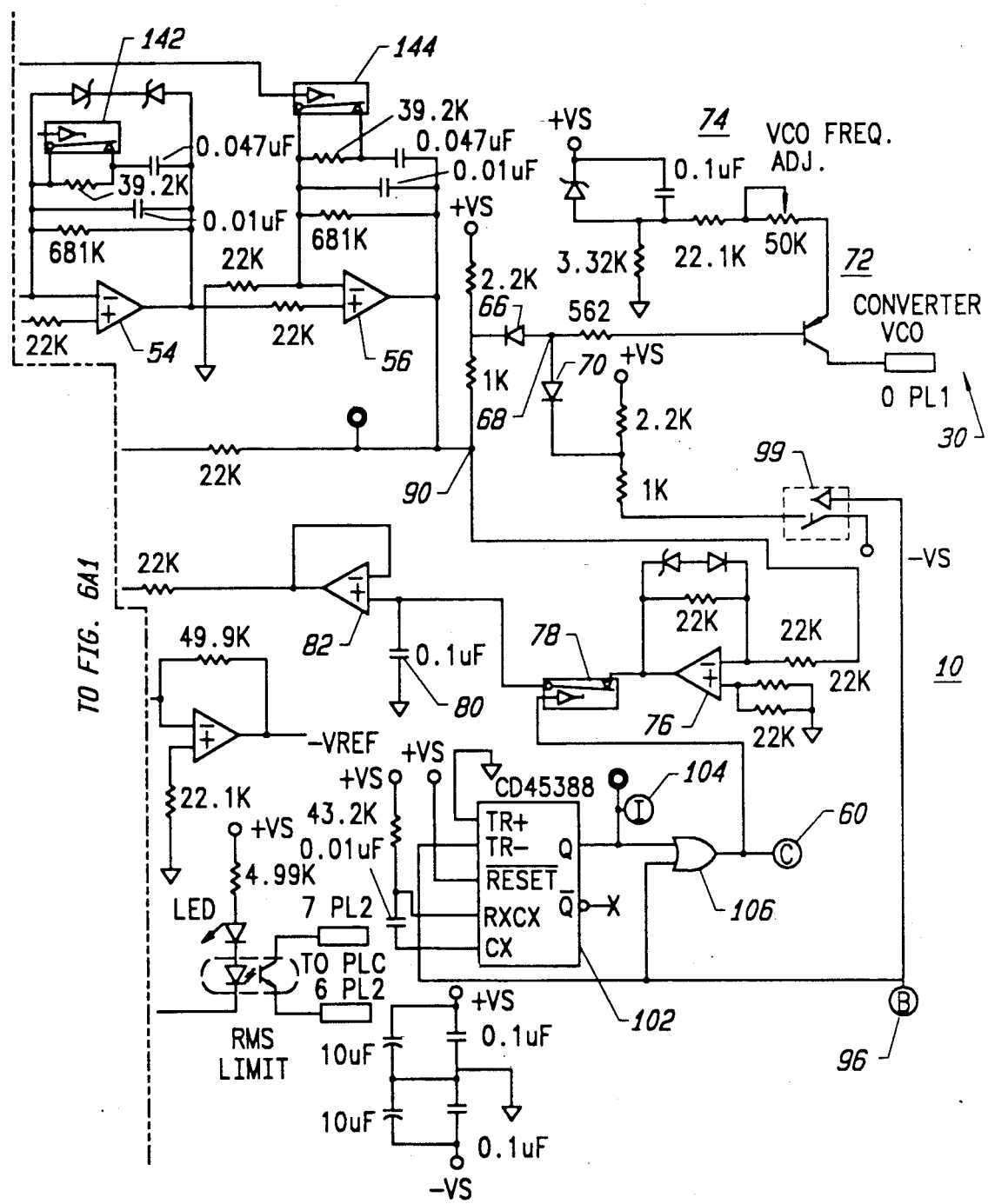
FIG. 6A2

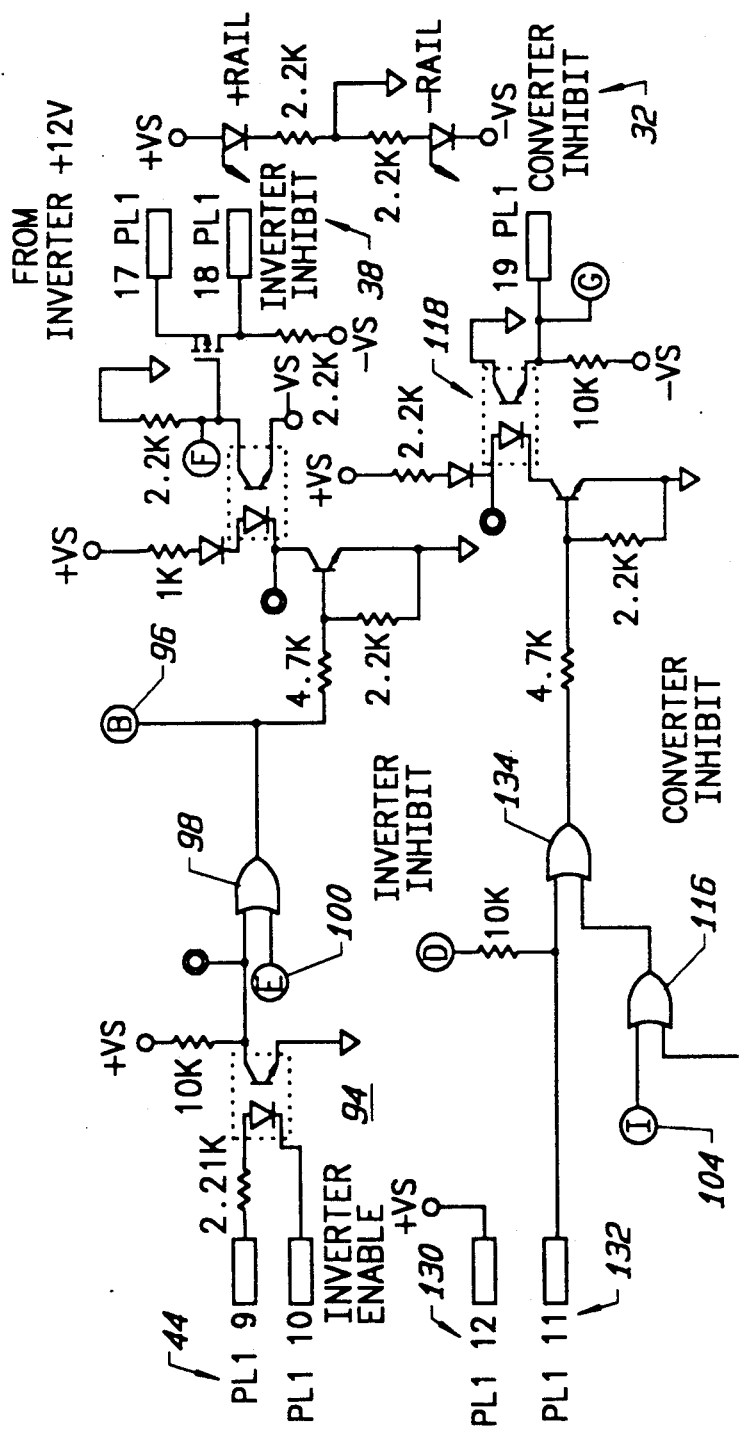
FIG. 6B1

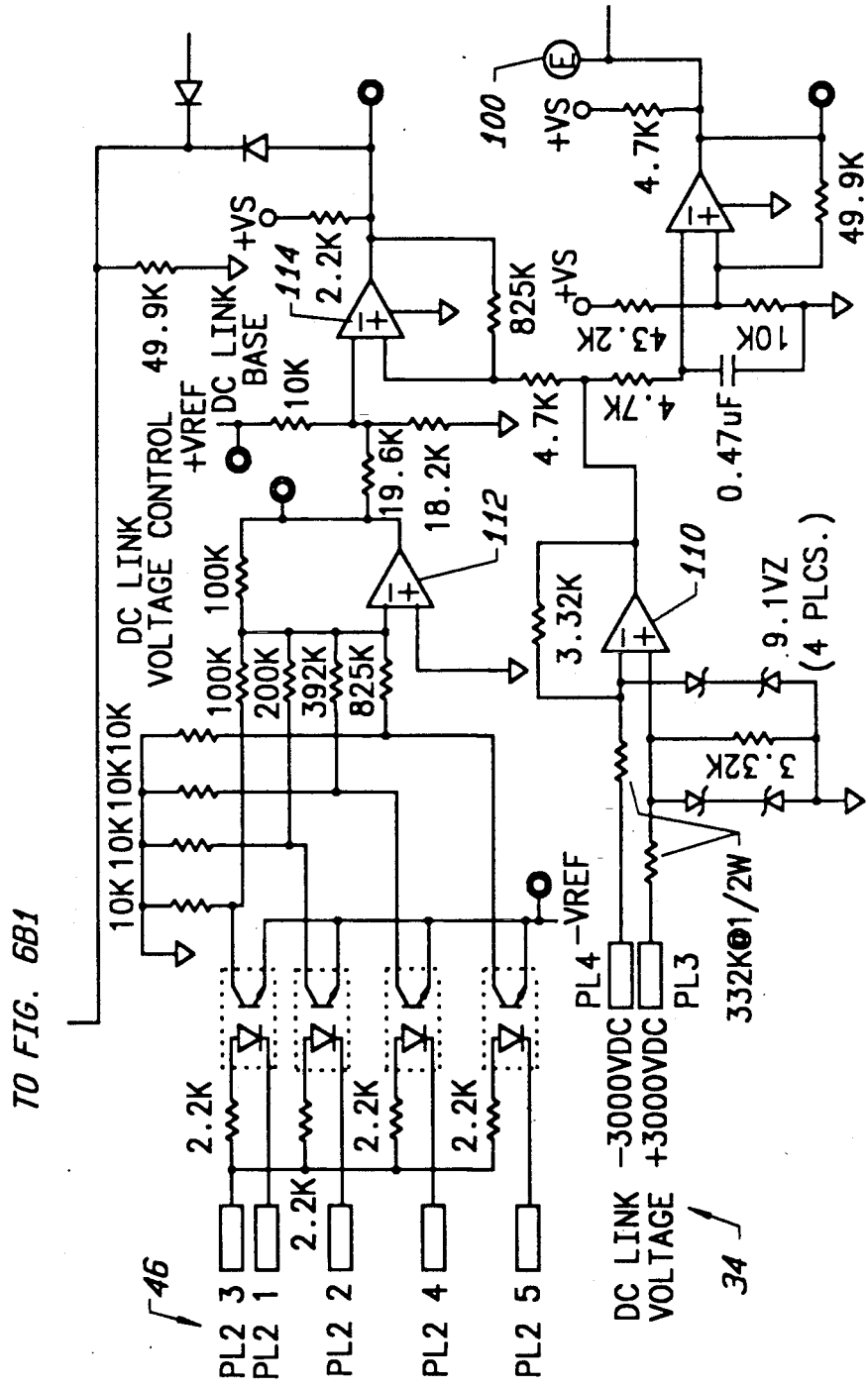
FIG. 6B2

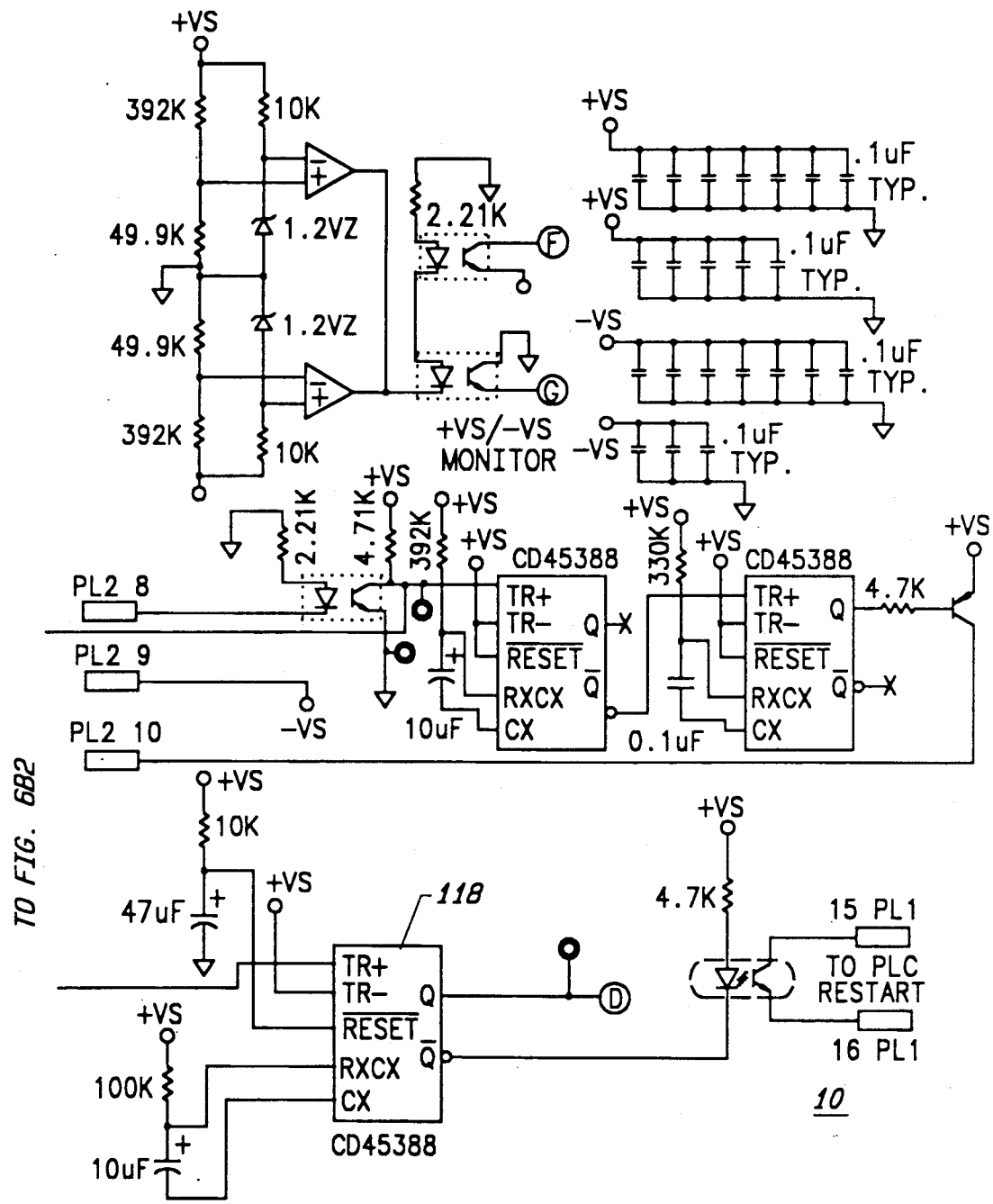
FIG. 6B3

METHOD AND APPARATUS FOR CONTROLLING THE POWER SUPPLY OF A LASER OPERATING IN A PULSE MODE

TECHNICAL FIELD

The present invention relates to a method and an apparatus for the control of a power supply of a laser operating in a pulse mode, and more particularly to an electronic control for controlling the pulsed operation of a $CO_2$ laser.

BACKGROUND OF THE INVENTION

In the prior art, it is known to use a single power supply to control the operation of a laser, such as a $CO_2$ laser, in two modes: a continuous or CW mode, wherein power is supplied continuously to the laser, and a pulsed mode, wherein power is intermittently supplied to the laser, such that the laser discharge tube emits pulses of laser power.

Although the power supply is designed to operate in two modes, the electrical requirements of the two modes of operation are quite different. Thus, in the pulsed mode, momentary currents of several times the average current of the CW mode is desired. One prior art solution was to design the entire power supply to take on the higher current requirement of operation in the pulsed mode. This meant designing all of the components of the power supply to handle the large current requirement.

In an effort to reduce the number of components required to handle the large current, a prior art power supply used a resonant-mode solid-state power supply that consisted of two separately controlled stages with capacitive energy storage between the two stages. The first stage is termed the resonant converter. The capacitive energy storage between the stages is termed the D.C. Link. The second stage is termed the resonant inverter.

The converter receives high D.C. voltage, typically 600 volts D.C., from a rectifier. Sinusoidal current pulses are switched from the input D.C. voltage received, operating at a frequency which is controllable. The pulsed D.C. current is then rectified to produce a second D.C. voltage, which is supplied to the D.C. Link. The control of the frequency of the D.C. pulse operation controls the average output current of the converter. A higher frequency results in greater average current.

The inverter receives the D.C. voltage from the converter, during CW operation, or from the D.C. Link during pulsed operation, and converts the D.C. voltage into an A.C. voltage.

In the CW mode of operation, the converter supplies D.C. energy directly and continuously to the inverter across the DC link. In the pulsed mode of operation, the converter supplies energy to the D.C. Link, which stores the energy. The inverter then takes the energy from the D.C. Link intermittently, as needed. Since the inverter supplies energy to the laser in the intermittent or pulsed mode, the inverter needs to be designed for the high peak current of pulsed mode operation. However, if the average power used in the pulse mode does not exceed that of the power in the CW mode, the converter can be designed for the average power, not the peak power. The peak energy, required in the pulsed mode, is supplied from the DC Link, with the DC Link recharged by the converter between pulses. Thus, in certain circumstances, only the inverter portion of the power supply needs to be designed with the higher peak current operation of the pulsed mode.

The regulation or control of such a power supply consisted of monitoring the output current supplied to the laser discharge tube. Typically, this is done by using a resistor to generate a proportional voltage, and is compared to an analog current command. The analog current command signal is a signal generated by the user or by an CNC (Computer Numeric Control), or other means, to establish a set point at which the output current of the power supply is to be regulated. The frequency of the converter is modulated to maintain the output current constant under load and input variances. This works relatively well for the steady-state conditions of the CW mode.

In the pulse mode, however, the inverter is switched on and off thus opening and closing the current control loop. Between pulses, when the inverter is off, the converter will run at maximum frequency because there is no output current. The voltage on the DC link will rise until the converter "stalls" at the open circuit limit. The converter will "stall" when the voltage across it is approximately zero. This occurs when the DC Link voltage is approximately equal to the DC voltage, supplied as the input to the converter. The open circuit voltage is, therefore, purely dependent on the line voltage, which is unregulated.

Further, at the beginning of a pulse, when the inverter turns on, the peak current processed by the inverter is dependent upon the difference between the open circuit DC link voltage and the reflected voltage from the load. Since the open circuit D.C. Link voltage is unregulated, the peak current from the inverter is unregulated for line variations.

In addition, if the pulse current is higher than the current command, the converter cannot be modulated to achieve control because it can only raise the DC link voltage not lower it. The system runs unregulated until the inverter takes enough energy out of the DC link capacitance to bring the voltage into the regulation range. If the pulse ends before this occurs, then there is no regulation during the pulse.

To prevent the power supply from oscillating between full-off and full-on, and to achieve some control during the pulse mode, the control amplifier is typically bandwidth limited to achieve an averaging effect such that the average output current is controlled to meet the current command, if possible. This leaves the converter running at some average frequency during the entire pulse period. Because of this, if high peak current is needed, the average output current will be high, and if low average current is needed, then the initial peak is reduced excessively. In addition, because the bandwidth of the controller has been limited, the CW mode performance is also degraded severely.

SUMMARY OF THE INVENTION

In the present an invention, a power supply of the type for supplying an output current to a gaseous discharge apparatus in a continuous mode or in a pulse mode, is disclosed. The power supply has converting means for receiving a first direct current signal and for converting said first direct current signal into a second direct current signal, energy storage means for receiving said second direct current signal and for storing the electrical energy of said second direct current signal, and inverting means for receiving the voltage from said energy storage means and for inverting the voltage received to produce a first alternating current signal. The improvement of the present invention provides means for detecting said output current supplied to said gaseous discharge apparatus, and means for detecting the voltage from said energy storage means. In addition, the apparatus of the present invention has means for receiving a first signal, representative of the desired output current, a second signal, representative of the desired voltage from the energy storage means, and a third signal, representative of the on and off state of operation of said inverting means. An electronic control means receives said output current detected, said voltage detected, and said first, second and third signals to control said converting means and said inverting means.

The present invention also relates to a method of controlling a power supply operating in the pulsed mode.

BRIEF DESCRIPTION OF THE DRAWINGS

FIG. 6(a & b) are detailed circuit diagrams of the electronic controller of the present invention, shown in FIG. 1.

DETAILED DESCRIPTION OF THE INVENTION

Figure 1:
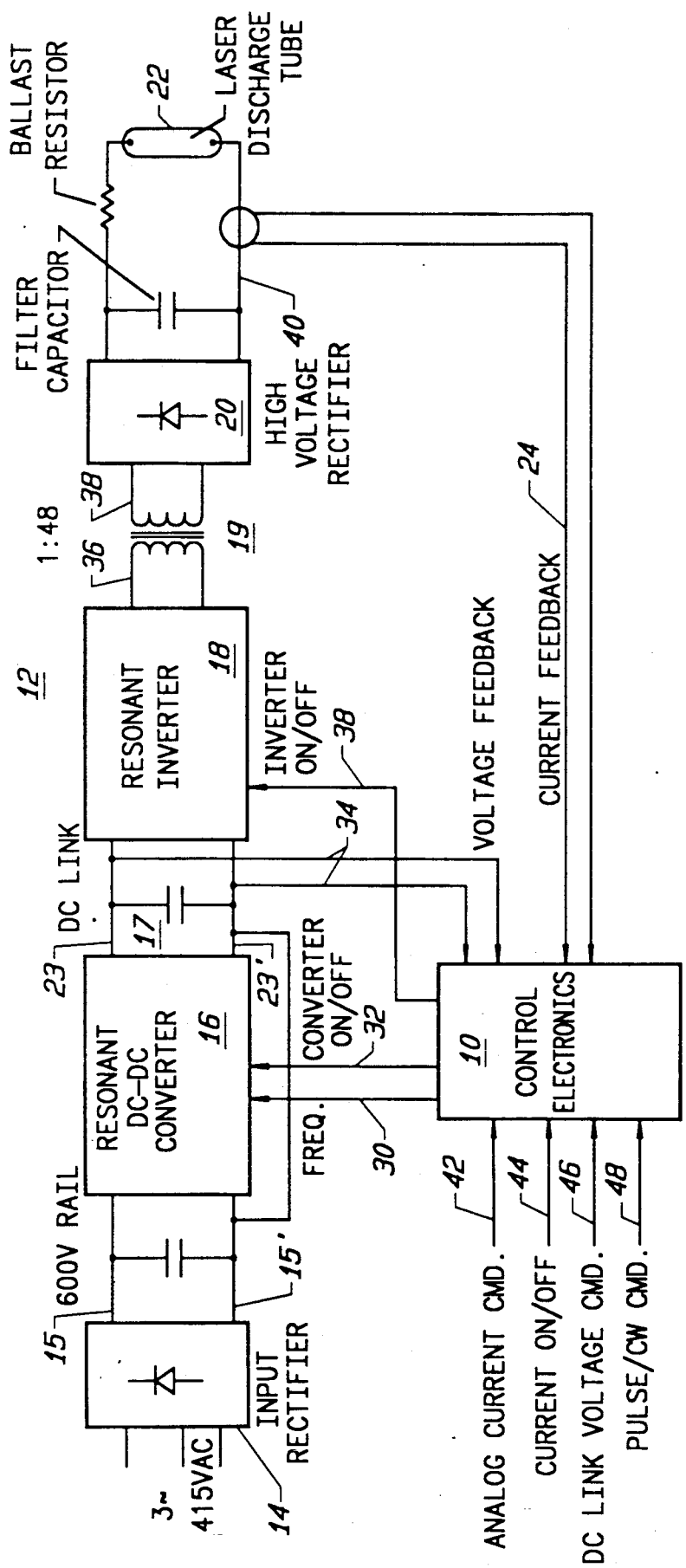
FIG. 1 is a schematic block level diagram of the improved power supply of the present invention with the electronic controller of the present invention.

Referring to FIG. 1, there is shown in schematic block level diagram a power supply 12, with the electronic controller 10 of the present invention. The power supply 12 is used to supply current to a gaseous discharge apparatus 22, such as a laser discharge tube 22. More particularly, the power supply 12 can be used to control the current supplied in two modes, CW and pulsed, to a $CO_2$ laser.

The power supply 12 comprises conventional prior art components, such as an input rectifier 14, DC-DC converter 16, DC link 17, resonant inverter 18, transformer 19, and high voltage rectifier 20. These components will be briefly described.

Figure 2A:
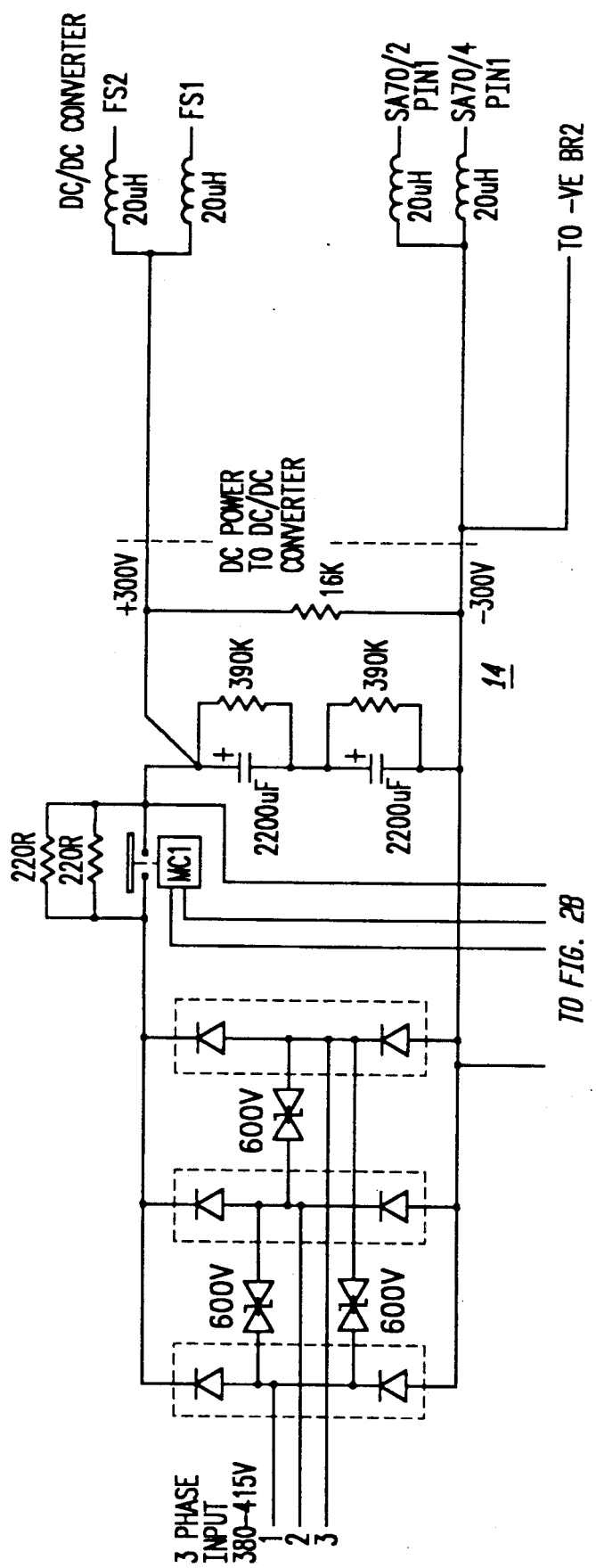
FIG. 2 is a circuit diagram of the input rectifier of the prior art, shown in FIG. 1.
Figure 2B:
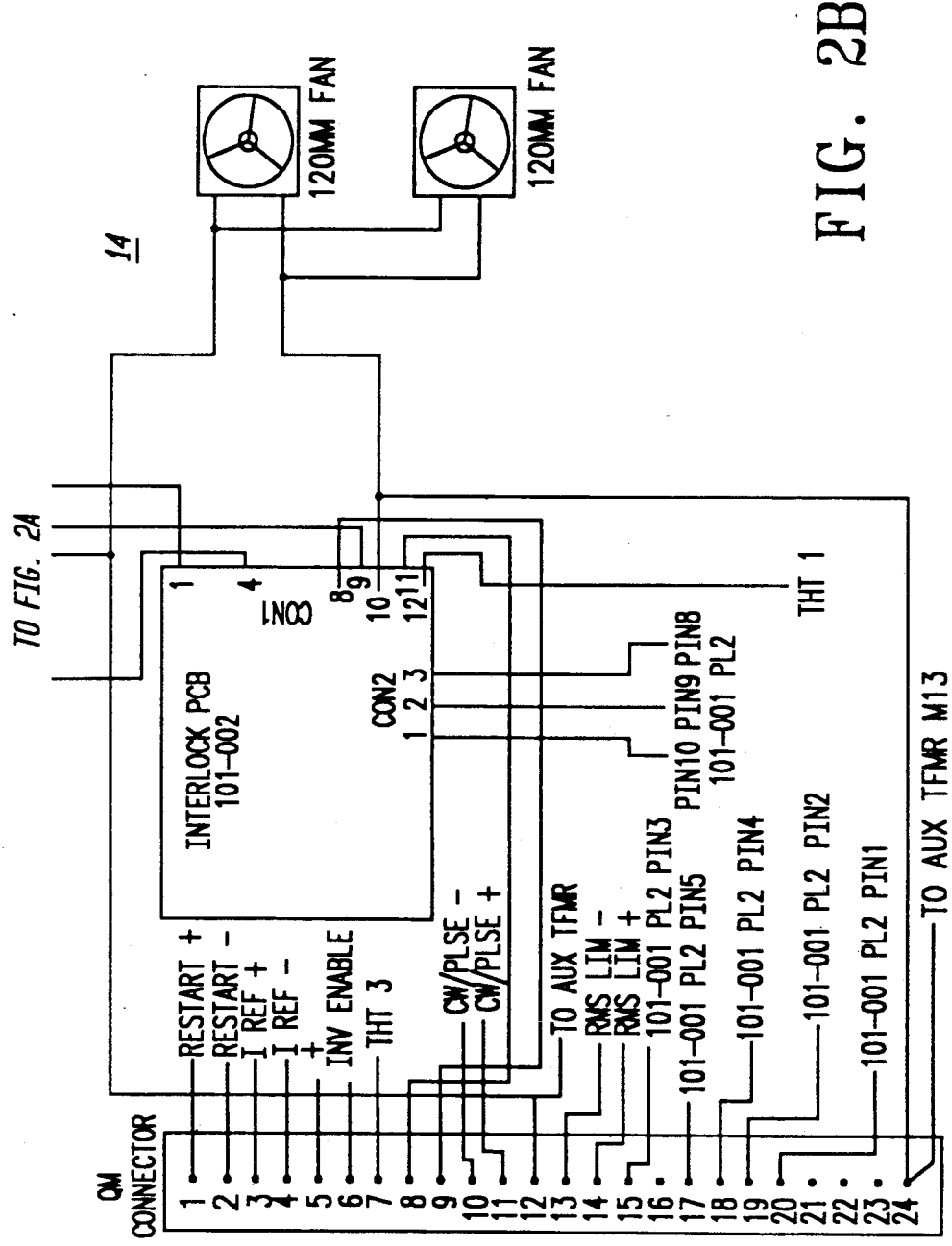

The input rectifier 14, of the prior art, shown in greater detail in FIG. 2, receives a three phase alternating current signal, such as 415 VAC, and converts the AC signal into a +and −300 volt D.C. signal. This +and −300 volt D.C. signal, called the input DC signal, is supplied along the input D.C. Rail 15-15' to the converter 16.

Figure 3A:
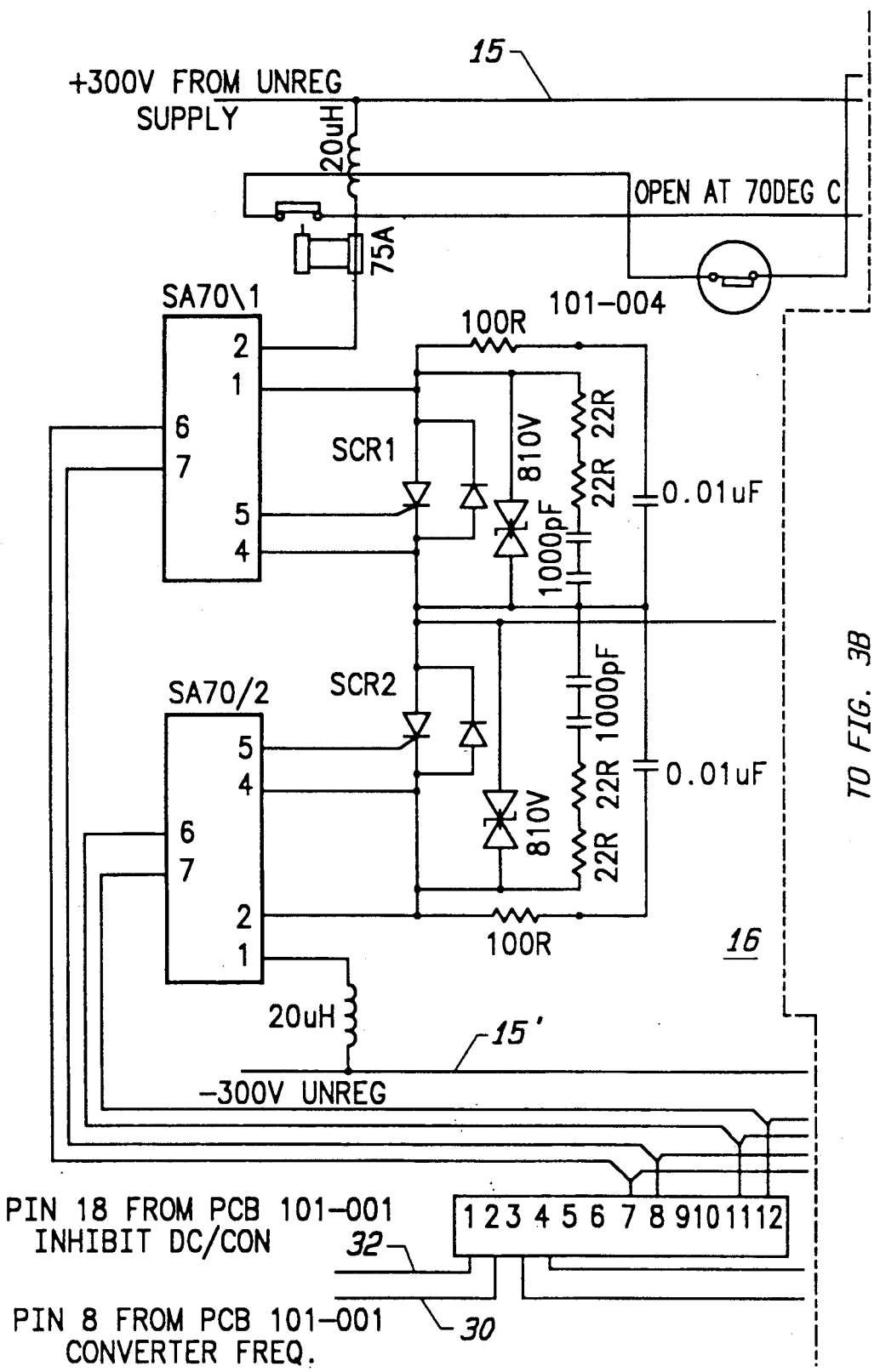
FIG. 3 is a circuit diagram of the resonant converter and DC Link of the prior art, shown in FIG. 1.
Figure 3B:
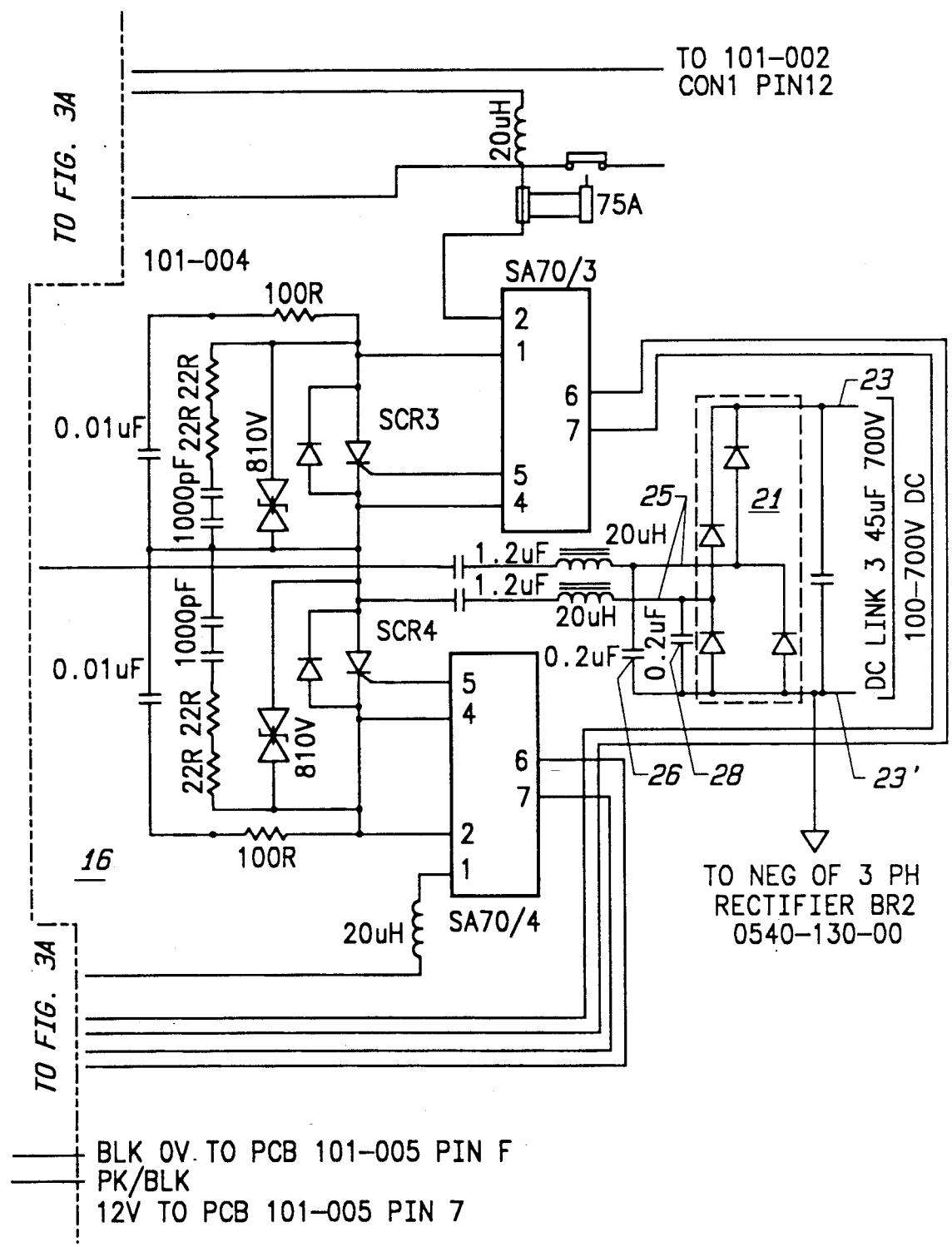

The converter 16 is shown in greater schematic detail in FIG. 3. With the exception of capacitors 26 and 28, whose function will be described in greater detail, the converter 16 is of prior art. The converter 16 receives the input DC signal 15-15', 15', and chops it into a sinusoidal current pulse train 25, having a frequency, which is controllable. The frequency is controlled by the frequency control signal 30. The sinusoidal current pulse train 25 is then rectified by the four diode rectifier bridge 21, and produced as an intermediate DC signal 23 and 23', with 23 being of more positive polarity than 23'. In addition, the production of the intermediate DC signal 23-23' is controllable by the Converter On/Off signal 32. The frequency control signal 30 and the converter on/off signal 32 are both generated by the controller 10 and supplied therefrom.

The intermediate DC signal 23-23' is supplied to the DC Link 17, which comprises a plurality of capacitors, although only one is shown in FIG. 1. The DC Link 17 functions to store the energy from the intermediate DC signal 23-23' in the capacitor 17. The voltage of the DC Link 17 is measured by the voltage feedback signal 34, which is supplied to the controller 10.

Figure 4A:
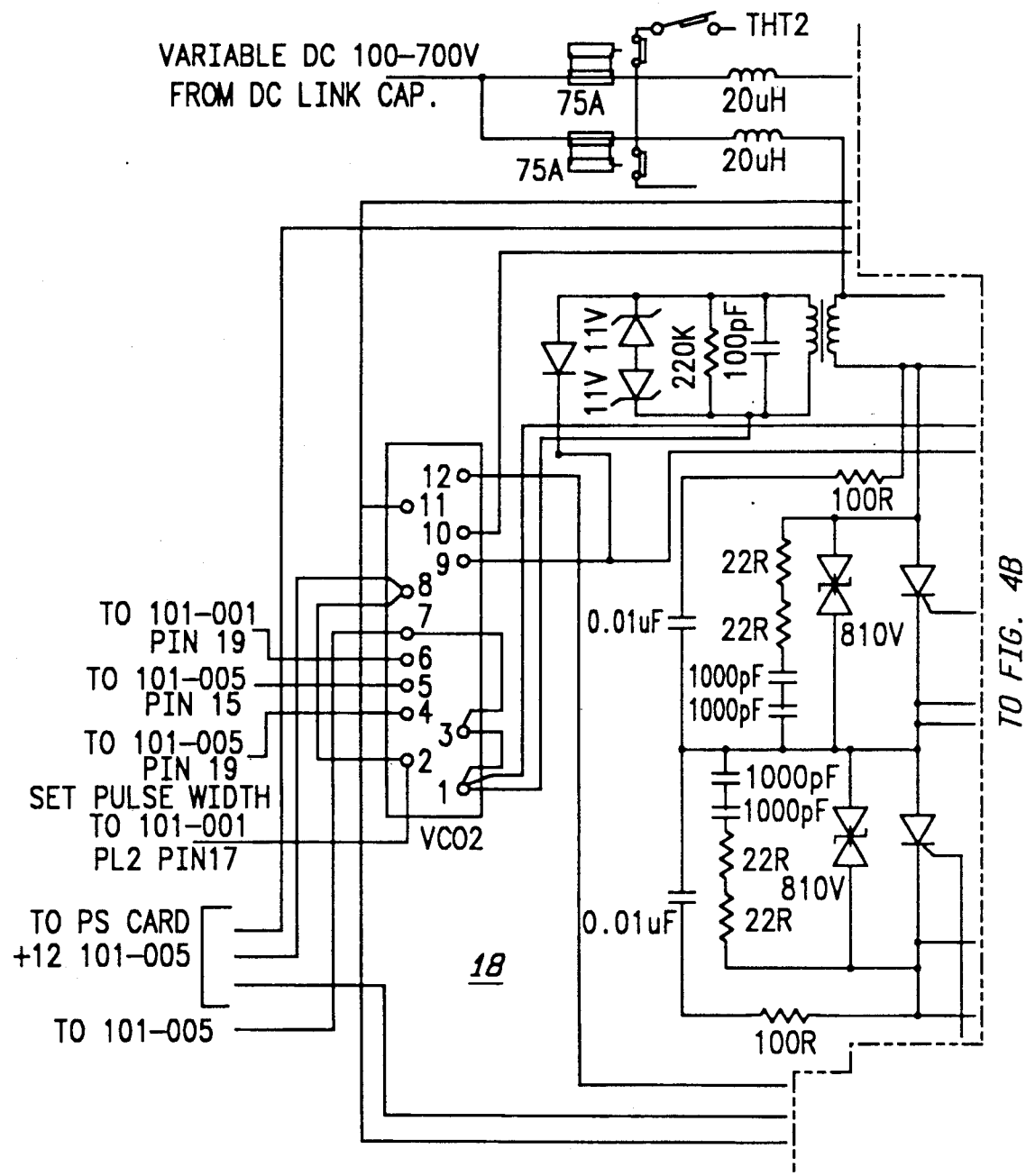
FIG. 4 is a circuit diagram of the resonant inverter of the prior art, shown in FIG 1.
Figure 4B:
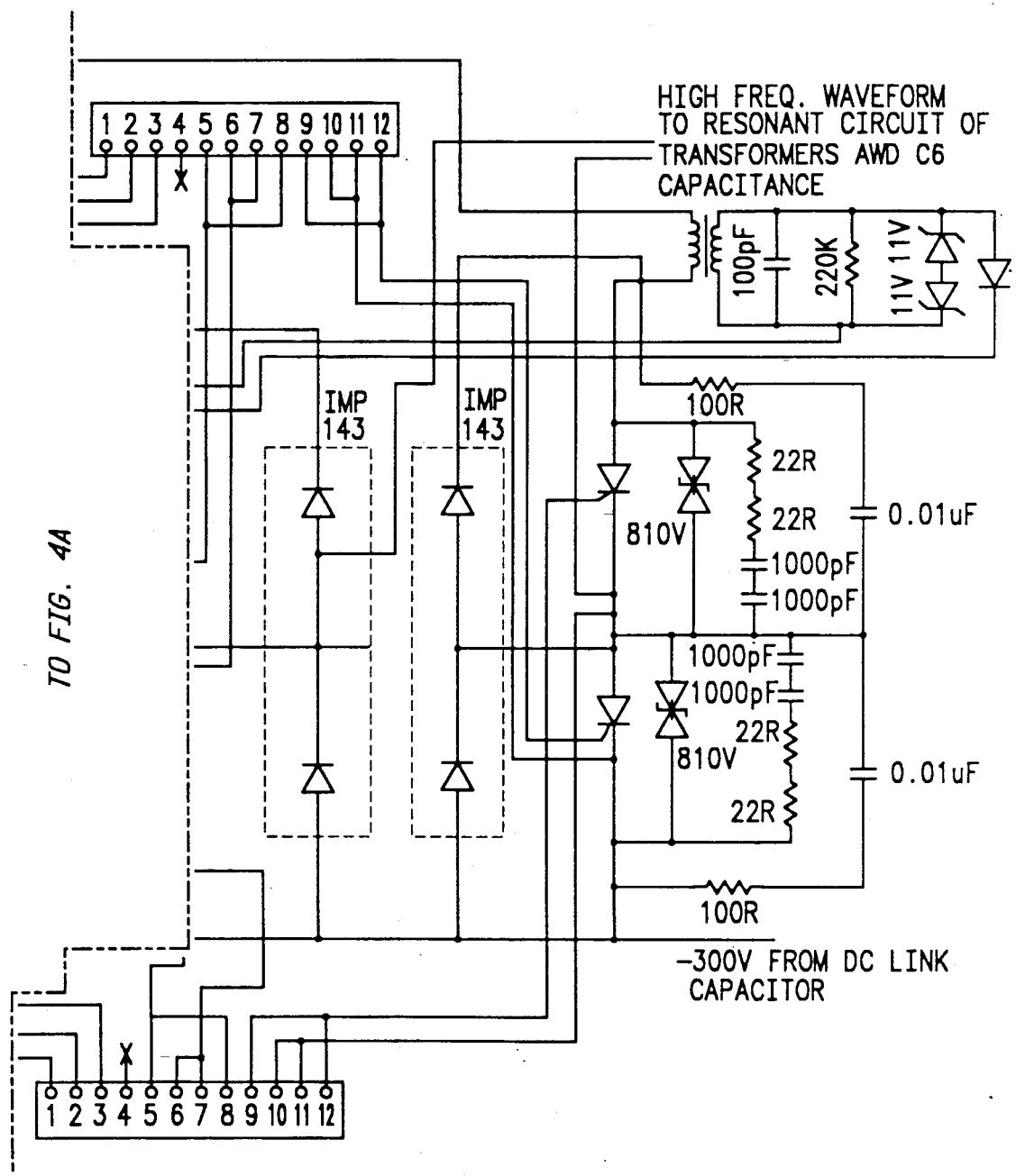

The intermediate DC signal is also supplied as the input to the resonant inverter 18, which is shown in greater schematic detail in FIG. 4. The inverter 18 receives the intermediate DC signal 23-23' and generates a first AC signal 36. The generation of the first AC signal 36 is controlled by the inverter on/off signal 38, generated by the controller 10, and supplied therefrom. The inverter 18 is of prior art.

The output AC signal 36 is supplied to a transformer 19, which steps up the voltage of the first AC signal 36, and produces a second high voltage AC signal 38.

Figure 5A:
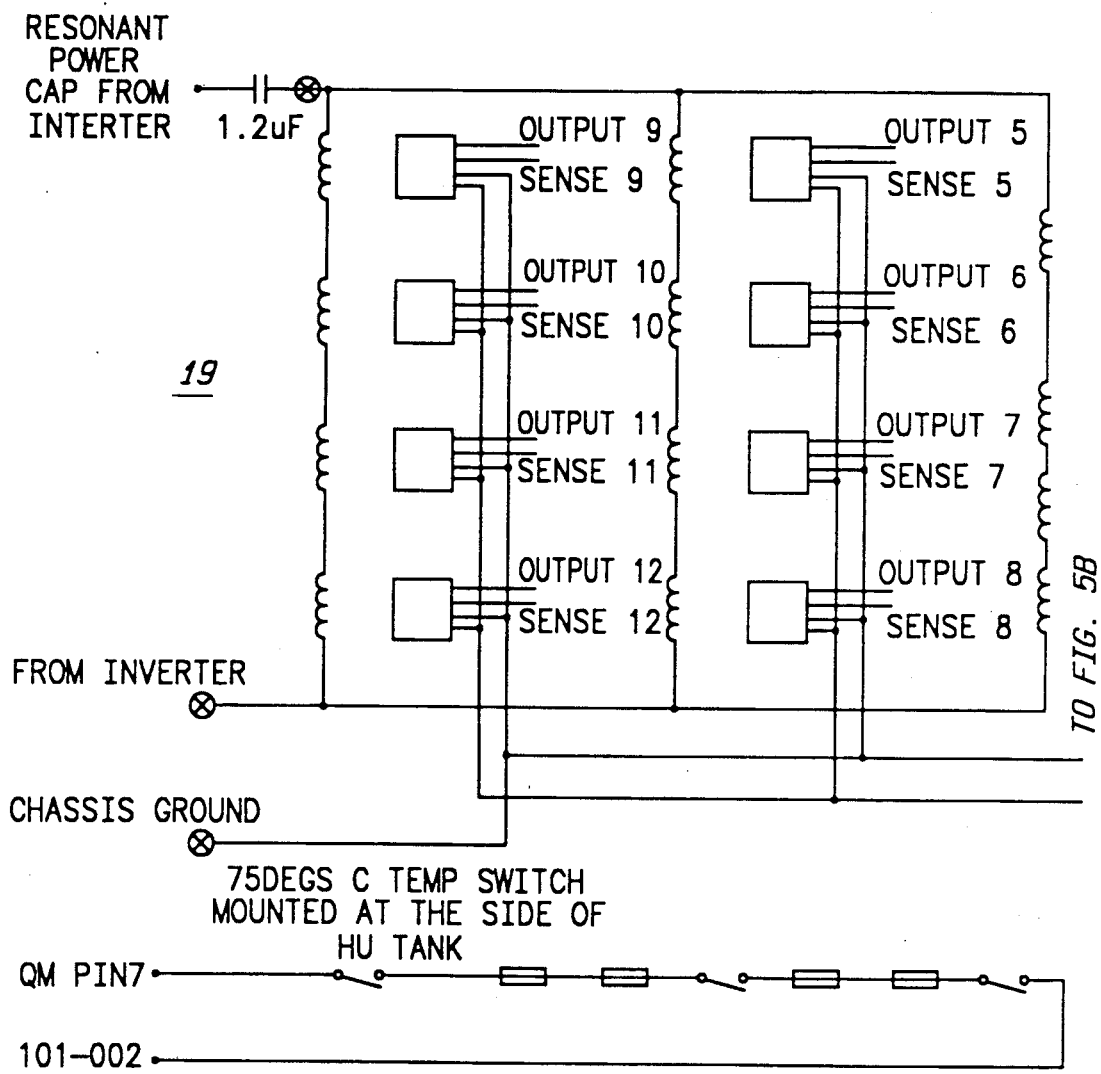
FIG. 5 is a circuit diagram of the transformer and high voltage rectifier of the prior art shown in FIG. 1.
Figure 5B:
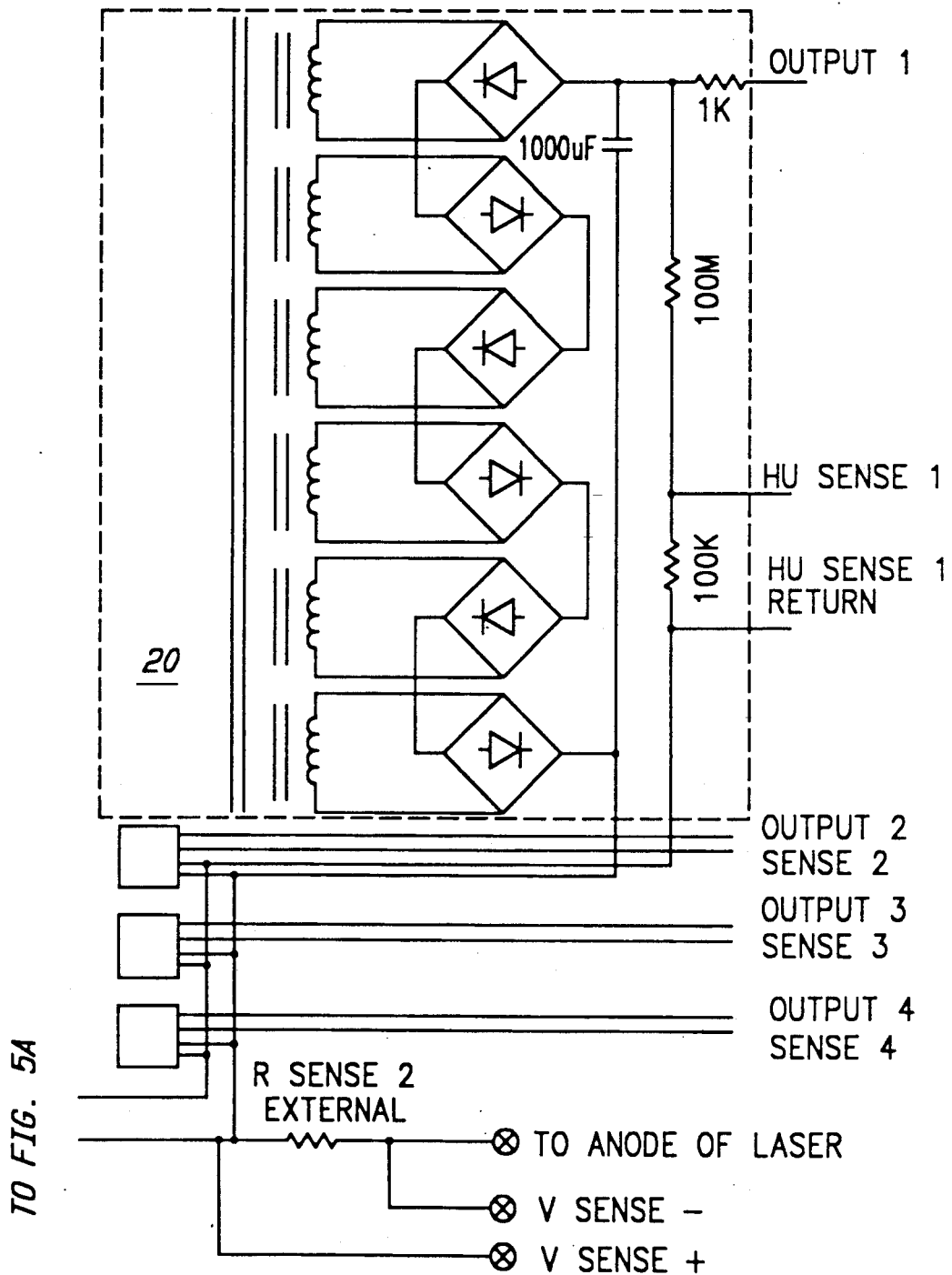

The high voltage AC signal 38 is rectified by the high voltage rectifier 20, shown in greater detail in FIG. 5, to produce an output DC signal 40. The high voltage rectifier 20 is also of prior art. The output DC signal 40 is then filtered and supplied to a laser discharge tube 22. In addition, the current of the output DC signal 40 is detected and is fed back to the electronic controller 10 along the current feedback signal 24.

In addition to receiving the voltage feedback signal 34, and the current feedback signal 24, and generating the frequency control signal 30, the converter on/off signal 32, and the inverter on/off signal 38, the electronic controller 10 also receives the following signals:
an analog current command signal 42;
a current on/off signal 44;
a DC Link voltage command signal 46; and
a pulse/CW mode signal 48.
In addition, as will be discussed, other signals are also supplied to the controller 10. The function of these and other signals will be discussed hereinafter.

Referring to FIGS. 6(a & b) there is shown in detailed schematic circuit diagram form the electronic controller 10 of the present invention. The controller 10 receives the current feedback signal 24, which is supplied to an operational amplifier 50. From the operational amplifier 50, the signal is supplied to a switch 52. The switch 52 is normally conductive, i.e. it permits the signal to be passed to the first error amplifier 54. The switch 52 is controlled by the signal generated from node 60 (which will be explained in greater detail hereinafter). When the signal at node 60 is high, the signal from the operational amplifier 50 does not pass to the first error amplifier 54.

The analog current command signal 42 is a signal representative of the desired current level at the output current 40. The analog current command signal 42 is received by the controller 10 and is supplied to the first amplifier 62, which is then supplied to a second amplifier 64. From the second amplifier 64, the output is also supplied to the first error amplifier 54. From the first error amplifier 54, the signal is passed to a second error amplifier 56. The first and second error amplifiers 54 and 56 function as a two stage current regulator to compare the current feedback signal 24 with the analog current command signal 42. The result of the comparison is a servo signal supplied to the node 90. From the node 90, the signal is supplied through a first diode 66 to a node 68.

The node 68 is also supplied with the output of a second diode 70. The first and second diodes 66 and 70 form a diode OR gate at the node 68. The diode (66 or 70) generating the lower voltage will prevail and the voltage will appear at the node 68.

From the node 68, the signal is supplied to the base of an emitter follower transistor 72. A bias network 74 controls the current of the transistor 72. The collector is the frequency control signal 30 supplied to the converter 16. In general, the supplied voltage minus the emitter voltage at the transistor 72 divided by the resistance in the bias network 74 controls the current of the frequency control signal 30. The emitter voltage at the transistor 72 is determined by the voltage supplied on the base to the transistor 72, which is from the node 68. The lower the voltage on the base of the transistor 72, the greater the current of the frequency control signal 30, resulting in a higher frequency of operation by the converter 16. As previously discussed, this would result in a greater average current of the intermediate DC signal 23-23', which supplied to the DC Link 17.

The signal at the node 90 is supplied to the negative input of an operational amplifier 76. The output of amplifier 76 is supplied to a switch 78, which normally conductive. The switch 78 is switched to a non-conductive state by the signal at the node 60. The switch 78 is connected to a capacitor 80. The capacitor 80 follows the signal from the switch 78. Thus, the capacitor 80 stores the negative of the signal at the node 90. The capacitor 80 is also connected to the input of another amplifier 82. The amplifier 82 has a shorted feedback, and thus functions as a buffer for the signal store the capacitor 80. From the amplifier 8 the signal is supplied to a summing node 84.

The from the node 90 is also supplied to the summing node 84. Since the signal from the amplifier 82 is the negative of the signal from the node 90, difference in the two signals is created at the summing node 84.

The summing node 84 provides an input to an error am 86, whose output is supplied to a switch 88. The switch 88 is switched also by the signal supplied from the node 60. However, switch 88 is normally non-conductive. Thus, switch 88 operates in opposition to the function of the switches 52 and 78.

The amplifiers 76 and 82, along with the capacitor 80 function as a sample and hold circuit. This sample hold circuit is activated during the plateau interval (discussed later), whenever there is a closed electrical path supplying the signal from the node 90, through the amplifier 76 to the capacitor 80. This signal is held and stored in the capacitor 80 when the switch 78 is turned off by the signal at the node 60.

The current feedback signal 24 is also supplied to an RMS detecting circuit 92. The RMS detecting circuit 92 limits output current by controlling the voltage of the DC Link 17. Thus, it functions as a protection circuit for the inverter 18, transformer 19 and rectifier 20.

The current on/off signal 44 is supplied to an opto-isolation circuit 94 (FIG. 6b). The signal is then supplied to an OR gate 98. The output of the OR gate 98 is connected to a node 96. Another input to the OR gate supplied from the node 100. The signal from node 96 also generates the inverter on/off signal 38.

The signal at the node 96 is used to control a switch 99 (FIG. 6a). When the signal at node 96 is high, indicating inverter inhibit, switch 99 is switched to a conductive state. This pulls the diode 70 to a lower voltage than the voltage from diode 66, at the node 68. The signal at the node 96 is also supplied to 102. In the preferred embodiment, the one-shot is set for 500 microseconds. The one-shot is activated upon a change in the signal at the node 96 from high to low. The output of the one-shot 102 is supplied to the node 104. The signals from the nodes 104 and 96 are supplied to an OR gate 106, whose output is the node 60. Thus, at the node 60, the signal is high during the time period when signal at node 96 is high, and for a period thereafter determined by the one-shot 102.

The voltage feedback signal 34 (FIG. 6b) is supplied to a differential receiver attenuator 110.

The attenuator 110 attenuates by 100 to 1 the detected voltage 34 from the DC Link 17. The DC Link voltage command signal 46 is a programmable analog reference signal and is supplied as a BCD signal. The BCD is decoded by a weighted summing amplifier 112, to give a set point between 400 and 625 volts, which is supplied to the negative input of a comparator 114. The output of the differential attenuator 110 is supplied the positive input of the comparator 114. The output of the comparator 114 is supplied to an OR gate 116, to which the signal from the node 104 is also supplied. From the OR gate 116, the signal is passed through another OR gate 134 and then through an opto-isolator 118 and is produced as the converter on/off signal 32, supplied to the converter 16.

The of the differential attenuator 110 is also supplied a window comparator 117. The window comparator 117 is supplied with another input which sets threshold is representative of 350 volts DC and 200 volts DC. If the result of the comparison is low (i.e. signal 34 is over the preset voltage of 350 volts), a signal is generated at the node 100. If the result of the comparison is high, (the signal 34 drops below 200 volts), the signal at node 100 is high. The signal from the node 100 is also passed through a one-shot 118, which generates a one second restart pulse in the event the signal at the node 100 changes from low to high.

In the event the voltage on the DC link 17 falls below 200 volts, the output of the comparator 117 will be high at the node 100. With the node 100 at high, the output of the OR gate 98 will be high, which causes the inverter on/off signal to be at high, keeping the inverter 38 turned off, even if the current on/off signal 44 goes high. The comparator 117 is a protection circuit to ensure that the DC link voltage does not fall below 200 volts. Clearly, this voltage can be any variable and can even be user programmable.

The function of the electronic controller 10 will be described with respect to the different modes of operation.

I. CW Mode of Operation

In this mode of operation, the pulse/CW mode signal 48 goes high, to indicate CW mode of operation. This results in node 140 going low. This opens the switches 142 and 144. The frequency control signal 30 is generated by comparing the analog current command signal 42 the current feedback signal 24 with error amplifiers 54 and 56, and varying the need as required. The opening of the switches increases the gain of the error amplifiers 54 and 56.

II. Pulse Mode of Operation

A. The Inverter 18 Is Off

In this mode of operation, the current on/off signal 44 off. With the signal 44 low, the signal at the node 96 will be high. Finally, the inverter on/off sign 38 supplied to the inverter 18 will also be high. Thus, the inverter 18 will off.

With the node 96 high, the signal at node 60 will also b With the inverter 18 off, the current feedback signal 24 will be zero. However, with the signal at the node 60 being high, the switch 52 is switched so that it does not conduct the signal from the amplifier 50 to the error amplifier 54. Thus, the current feedback signal 24 is prevented from contributing to the feedback circuit.

With the node 96 at high, switch 99 is closed, so that 70 becomes conductive, driving to a low voltage state. The voltage at node 68 will be low, determined by the diode 70. This results in maximum current to the frequency control signal 30.

To prevent "stall" at the open circuit, the voltage feedback signal 34 is used to control the charging of the DC Link 17. Thus, the voltage feedback signal 34 is compared to the DC Link voltage command signal 46 by the comparator 114. If the result of the comparison is low (i.e. the voltage on the DC link 17, as detected by the voltage feedback signal 34, is below the desired voltage signal (DC Link voltage command signal 46)), then the output of the comparator 114 is low. The output of the OR gate 116 will also be low (the signal at the node 104 will also be low at this time. This will be explained in greater detail hereinafter). Thus, the converter on/off signal will be low, indicating that the converter is to be turned on.

At any time during this time interval that the voltage feedback signal 34 equals to or exceeds the desired DC link command signal 46, the comparator 114 will generate a high signal. The high signal is passed through the OR gate 116 and through the optoisolator to cause a high signal to be supplied on the converter on/off signal 32. A high on the converter on/off signal 32 will cause the converter 16 to turn off, preventing the charging of the DC Link 17 by the converter 16.

In summary, during the time period when the inverter 18 is turned off, the current feedback signal 24 is blocked from generating the frequency control signal 30. Instead, another circuit generates a maximum current signal which is supplied as the frequency control signal 30. The charging of the DC Link 17 by the converter 16 is controlled by the converter on/off signal 32, based upon the voltage feedback signal 34 compared to the desired DC Link voltage command signal 46.

B. The Inverter 18 Just Turns On ("Blanking Interval")

The time period in which the inverter 18 just turns on and for a short time period thereafter, determined by the one-shot 102, is termed the blanking interval. As previously discussed, this time period is approximately 500 microseconds and is set by the one-shot 102. However, this time period can be variable and can even be programmable under user control.

During the blanking interval, the current on/off signal 44 is high. This results in the signal at node 96 to be low. The inverter on/off signal 38 will be low, so that the inverter 18 will be on. In addition, the switch 99 is switched to a non-conductive state. Thus, the signal at the node 68 is determined by the signal from the diode 66.

With the node 96 at low and just having switched, the one-shot 102 operates to generate a high signal at node 104. In addition, during the blanking interval, the signal at node 60 will also be high.

With the signal at node 104 high, the signal at node 104 is supplied to the OR gate 116, which causes the converter on/off signal 32 be high, thereby turning off the converter 16.

With the node 60 at high, switch 52 is activated, blocking the current signal 24 from the error amplifier 54. However, the signal from the node 60 also activates switch 88 causing a closed path from the error amplifier 86 to the error amplifier 54. The signal on the capacitor 80 is held and is supplied to the error amplifier 86. The signal from the node 90 is supplied to the error amplifier 86 at the summing 84. In addition, switch 78 is rendered non-conductive, thereby blocking the signal path from node 90 through the amplifier 76 to the capacitor 80. During this time period, the entire current regulator circuit is held at its last active value. As previously discussed, the signal from the node 90 is the negative of the signal (or is the inverted signal) from the capacitor 80. Thus, the output of the error signal 86 is passed through the switch 88 is used to cause the servo amplifiers to correct signal at node 90 to match the signal stored in the capacitor 80. This creates a pseudo feedback signal. The pseudo feedback signal is used to generate the frequency control signal 30.

Although a frequency control signal 30 is generated, with the magnitude determined by the signal held in the capacitor 80, the converter 16 is off. Thus, the frequency control signal 30 has no effect during this time period. Therefore, the converter 16 cannot charge the DC Link 17. Since the converter 16 is off, the voltage feedback control signal 34 also has no effect the converter 16.

In summary, during this time interval, the converter on/off signal 32 is high, causing the converter 16 to turn off. The current on/off signal 44 is high, causing the inverter on/off signal 38 to be low, causing the inverter 18 to turn on. The current feedback signal 24 is blocked from generating the frequency control signal 30. A pseudo feedback signal, is generated. The pseudo feedback signal is generated by using the signal in a capacitor 80. The pseudo feedback signal causes the generation of the frequency control signal 30. However, with the converter 16 off, the frequency control signal 30 has no effect, but is held at its last active value.

C. The Inverter 18 Is On After The Blanking Interval

The time period in which the inverter 18 is on after the blanking interval is termed the plateau interval. Since this is the time period after the period determined by the one-shot 102, this time period can be variable and can even be programmable under user control.

During the plateau interval, the current on/off signal 44 is high. This results in the signal at node 96 to be low. This keeps switch 99 in the open position. The inverter on/off signal 38 will be low, so that the inverter 18 will be on.

With the node 96 at low with the one-shot 102 having timed out, the signal at node 104 will be low. In addition, the signal node 60 will also be low.

With the signal at node 104 low, the signal at node 104 is supplied to the OR gate 116, which causes the converter on/off signal 32 to be controlled by the comparison of the voltage feedback signal 34 with the DC link voltage command signal 46. Thus, the feedback loop of using the voltage feedback signal 34 to control the converter on/off signal 32 is active.

With the signal at node 60 being at low, the switches 52 and 78 are re-established in their normal conductive state. In addition the switch 88 is turned off so that the pseudo feedback signal from the capacitor 80 is disabled. However, immediately at the start of the plateau period, the frequency control signal 30 supplied from the controller 10 is determined by the signal at the node 90. As previously discussed, this is from the capacitor 80. Thereafter, once the current feedback signal 24 is re-connected, it is used to generate the frequency control signal 30, as in CW operation.

During the plateau interval the signal at the node 90 is also supplied to the amplifier 76, at the negative input thereof. With the switch 78 closed, this signal is passed to the capacitor 80. Thus, capacitor 80 continuously stores and tracks the negative of the signal at the node 90. The output of the capacitor 80 is supplied to the buffer amplifier 82 to the summing node 84. The signal from the node 90 is also supplied to the summing node 84. Since the two signals are negative to one another, the signal at the summing node 84 will be a null signal. Thus, the input to the error amplifier 86 will be a nullity. In any event, the output of the error amplifier 86 is prevented by the switch 88 from being supplied to the error amplifiers 54 and 56.

Immediately upon the end of the plateau interval, switch 78 will open. Thus, the capacitor 80 will have stored therein the value of the signal at the node 90, immediately prior to the inverter 18 being turned off. This sampled and held signal is used to restart the frequency control signal 30 at the beginning of the plateau interval of the next cycle.

In summary, during this time interval, the inverter 18 is on. The converter 16 is also on, depending upon the voltage feedback signal 34 compared to the desired DC Link voltage command signal 46. The frequency control signal 30 is initially set by the current regulator output signal at node 90, held from the last plateau interval immediately prior to the inverter 18 being turned off. The frequency control signal 30 is thereafter controlled by the current feedback signal 24 as compared to the analog current command signal 42.

VOLTAGE DOUBLER CIRCUIT

Figure 7:
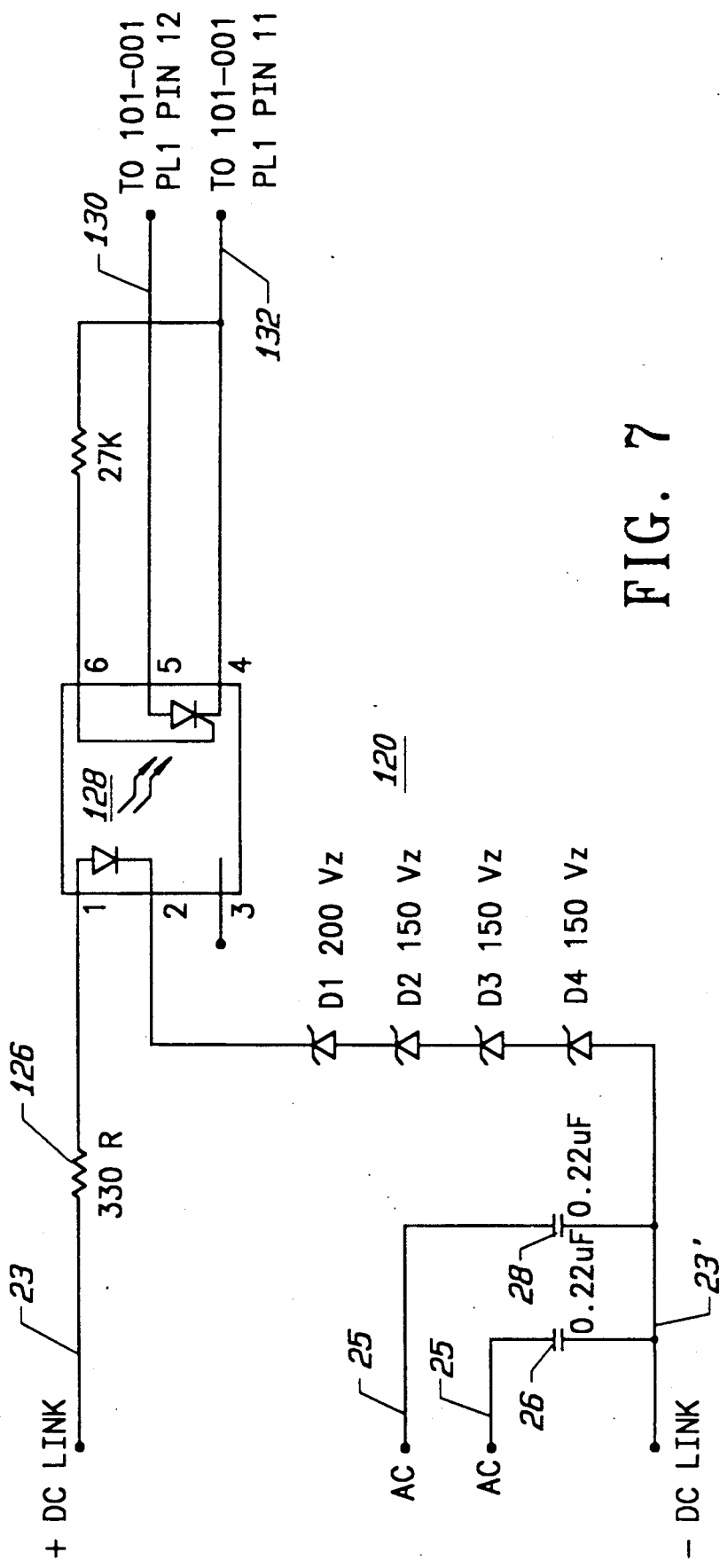
FIG. 7 is circuit diagram of the voltage doubler of the present invention.

Referring to FIG. 7, there is shown a circuit diagram of a voltage doubler circuit 120 of the present invention. The doubler circuit has two leads, 23 and 23' from the DC intermediate signal from the converter 16 The lead 23 is at a more positive potential than the lead 23'.

From the lead 23, the DC intermediate signal from the converter 16 is passed through a resistor 126, and to an opto isolator 128. From the opto isolator 128, the signal is supplied through four zener diodes, D1, D2, D3, and D4, having a total breakdown voltage of 650 volts. From the zener diodes, the signal is then supplied to the second lead 23'. The circuit 120 also comprises the first and second capacitors 26 and 28, connected to the second lead 23' at one end of each of the capacitors and to the sinusoidal current pulse train 25 at another end thereof. The output of the opto-isolator 128 is supplied to the nodes 130 and 132 (shown in FIG. 6b).

The circuit 120 serves two functions. First, it is a protection circuit. In the event the voltage feedback signal 34 and the electronics associated therewith malfunctions and the circuit is unable to provide feedback control of the charging of the DC Link 17, then the circuit 120 prevents the DC Link 17 from charging above 650 volts. Clearly this value can be varied by the choice of the zener diodes. Further, it can even be user programmable.

The circuit 120 operates as follows. The optoisolator 128 is turned on if the voltage at the DC Link 17 is above 650 volts. In that event, substantially a short circuit is developed between the nodes 130 and 132. Referring to FIG. 6b, there is shown the nodes 130 and 132. In the event a short circuit connects the nodes 130 and 132, a high voltage is supplied as the input to the OR gate 134. With the input to the OR gate at high, the output of the converter on/off signal 32 would also be high. This would turn off the converter 16. Thus, the converter 16 would be turned off to prevent over charging of the DC link 17.

The second function of the circuit 120 is to add the capacitors 26 and 28 to commutate the SCR's (shown in FIG. 3 as SCR1-4) in the converter 16. However, it was found unexpectedly that in addition to providing a commutation current for the SCR3 s, the capacitors 26 and 28 also doubled the voltage at the leads 23 and 23'. This doubling of the voltage has many useful applications. For example, if the input voltage to the converter 16 droops, as in the case of brown out, without the doubling circuit 120, the voltage to the DC link 17 may not be high enough to sustain enhanced laser action. However, with the doubling circuit 120, the voltage to the leads 23 and 23' is doubled, raising the voltage thereon so that enhanced lasing action can take place. Thus, with the voltage doubling circuit 120, it is possible to use even lower line voltage sources.

There are many advantages to the method and apparatus of the present invention. First by monitoring the voltage on the DC link and providing a feedback control thereof, the converter 16 can be controlled, without fear of stalling the converter 16. Further, by providing a separate charging circuit during the time period when the inverter 16 is off, the maximum charging rate can be used to charge the DC link to its set point between pulses without effecting the average current regulator circuit. In addition, since the voltage on the DC link 17 determines the initial peak current of a pulse, controlling the DC link voltage controls the peak pulse current as well.

Secondly, the controller 10 divides the on time of the inverter 18 between a blanking interval and a plateau interval. The invention is the discovery that during the blanking interval, the output current 40 is at its peak and is uncontrollable. Thus, during the blanking interval, the current feedback signal is ignored. In addition, the invention provides that during the blanking interval, when the inverter 18 is immediately on, the converter 16 is turned off. This permits the energy stored in the DC link 17 to be rapidly discharged and used by the inverter 18. In fact, in the event the converter 16 is turned on during the blanking interval, the addition of current o the DC link 17 at the very moment when it is being discharged, actually slows down the rate of discharge of the DC link 17. Maximum discharge of the DC link occurs when there is no charging by the converter 16.

Lastly, the invention recognizes the need to control the output current more tightly. Since the output current can be subject to radical swings, (due to it being off, and then suddenly on), the use of the output current to control the frequency of the converter 16 during all intervals can cause radical swings in the frequency of the converter. The invention overcomes this by providing a pseudo feedback signal which is the current feedback signal generated in the plateau interval of the previous cycle, immediately prior to the inverter being turned off. Thus, during the plateau interval, the current regulator circuit regulates the output current independently of whatever peak current existed during the blanking interval. This results in greater stability in the control of the frequency of the converter 16.

Since the current regulator is not exposed to the radical swings in the output current during pulsing, and is only active when the current can be controlled, the gain-bandwidth product can be much higher. This results in much better regulation and reduced offset error in both CW and pulse modes.

The invention can be used in several configurations. A single smaller power supply can be used to drive a single discharge lane in a small laser. A single bigger supply can be used to drive multiple discharge lanes in parallel/series combinations in a multi-lane laser. A multi-lane laser could be powered with each individual lane being driven by its own individual power supply, each individual supply incorporating the invention.

What is claimed is:

1. In a power supply of the type for supplying an output current to a gaseous discharge apparatus in a continuous mode or in a pulse mode, wherein said power supply having: converting means for receiving a first direct current signal and for converting said first direct current signal into a second direct current signal, energy storage means for receiving said second direct current signal and for storing the electrical energy of said second direct current signal, inverting means for receiving the voltage from said energy storage means and for inverting the voltage received to produce a first alternating current signal, wherein the improvement comprising:

means for detecting said output current supplied to said gaseous discharge apparatus;

means for detecting the voltage from said energy storage means;

means for receiving a first signal, representative of the desired output current;

means for receiving a second signal, representative of the desired voltage from the energy storage means;

means for receiving a third signal, representative of the on and off state of operation of said inverting means; and electronic control means for receiving said output current detected, said voltage detected, and said first, second and third signals to control said converting means and said inverting means.

2. The power supply of claim 1 wherein said converting means further comprising:

means for generating a sinusoidal current pulse signal, having a frequency; and means responsive to a supplied frequency control signal for controlling the frequency of said sinusoidal current pulse signal.

3. The power supply of claim 2 wherein said electronic control means further comprising:

means, responsive to said third signal, representative of said inverting means being off, and to said detected voltage being less than said desired voltage, for generating said frequency control signal for controlling the frequency of said sinusoidal current pulse signal.

4. The power supply of claim 3, wherein said frequency control signal serves to operate said sinusoidal current pulse signal at the maximum frequency.

5. The power supply of claim 1, wherein said converting means further comprising:

means, responsive to a fourth signal, for switching said converting means on and off.

6. The power supply of claim 5, wherein said electronic control means further comprising:

means, responsive to said third signal representative of said inverting means being on, for generating a timing signal;

means for generating said fourth signal, for switching said converting means off during said timing signal.

7. The power supply of claim 5, wherein said timing signal is generated for a period less than said third signal representative of said inverting means being on.

8. The power supply of claim 7, wherein said electronic control means further comprising:

means, responsive to said detected voltage being less than said desired voltage, for generating said fourth control signal for switching said converting means on.

9. The power supply of claim 8, wherein said electronic control means further comprising;

sample and hold means for holding the current signal of the output current at the end of the each time period when said third signal is representative of said inverting means being on.

10. The power supply of claim 9, wherein said electronic control means further comprising;

means for supplying the current signal held by said sample and hold means from the time period when said third signal last representative of said inverting means being on, as said first signal.

11. The power supply of claim 1 further comprising:

means for receiving said second direct current signal and for increasing the voltage of said second direct current signal before supplying said second direct current signal to said energy storage means.

12. The power supply of claim 11 wherein said second direct current signal is supplied on a first and a second lead, with the first lead being more positive in polarity than the second lead.

13. The power supply of claim 12 wherein said increasing means further comprising:

a first capacitor means having a first end and a second end, with the first end connected to the second lead;

a second capacitor means having a first end and a second end with the first end connected to the second lead, and means for supplying an alternating current signal to the first ends of said first and second capacitor means, for increasing the direct current voltage between said first and second leads.

14. The power supply of claim 1 wherein said gaseous discharge apparatus is a $CO_2$ laser.

15. An apparatus to increase the voltage of a direct current signal, supplied on a first and a second lead with the first lead being more positive in polarity than the second lead, comprising:

a first capacitor means having a first end and a second end, with the first end connected to the second lead;

a second capacitor means having a first end and a second end with the first end connected to the second lead; and means for supplying an alternating current signal to the first ends of said first and second capacitor means, for increasing the direct current voltage between said first and second leads.

16. A method of controlling a power supply of the type for supplying an output current to a gaseous discharge apparatus in a continuous mode or in a pulse mode, wherein said power supply having: converting means for receiving a first direct current signal and for converting said first direct current signal into a second direct current signal, energy storage means for receiving said second direct current signal and for storing the electrical energy of said second direct current signal, inverting means for receiving the voltage from said energy storage means and for inverting the voltage received to produce a first alternating current signal, wherein said method comprising:

detecting said output current supplied to said gaseous discharge apparatus;

detecting the voltage from said energy storage means;

receiving a first signal, representative of the desired output current;

receiving a second signal, representative of the desired voltage from the energy storage means;

receiving a third signal, representative of the on and off state of operation of said inverting means; and receiving said output current detected, said voltage detected, and said first, second and third signals and controlling said converting means and said inverting means in response thereto.

17. The method of claim 16 wherein said inverter is turned on and off.

18. The method of claim 17 further comprising the step of:

turning the converter off during a time interval commencing when the inverter is turned on.

* * * * *